United States Patent [19]
Loffelmann et al.

[11] Patent Number: 5,879,554
[45] Date of Patent: Mar. 9, 1999

[54] POLYSULFONE MEMBRANE AND METHOD FOR ITS MANUFACTURE

[75] Inventors: Walter Loffelmann, Erlenbach; Jurgen Passlack, Ennepetal; Harald Schmitt, Laudenbach; Heinz-Dieter Sluma; Michael Schmitt, both of Grossostheim, all of Germany

[73] Assignee: Akzo Nobel N.V., BM Arnhem, Netherlands

[21] Appl. No.: 397,195

[22] PCT Filed: Aug. 23, 1993

[86] PCT No.: PCT/EP93/02262

§ 371 Date: Apr. 7, 1995

§ 102(e) Date: Apr. 7, 1995

[87] PCT Pub. No.: WO94/05406

PCT Pub. Date: Mar. 17, 1994

[30] Foreign Application Priority Data

Sep. 9, 1992 [DE] Germany .............................. 42 30 077

[51] Int. Cl.⁶ .................................................. B01D 39/00
[52] U.S. Cl. ................................ 210/500.23; 210/500.23; 210/500.27; 264/41; 264/49; 264/178 R
[58] Field of Search ........................ 210/500.23, 500.41, 210/490, 500.27; 264/177.4, 178 R, 41, 49

[56] References Cited

U.S. PATENT DOCUMENTS

| | | |
|---|---|---|
| 3,855,122 | 12/1974 | Bourganel . |
| 4,207,182 | 6/1980 | Marze . |
| 4,545,910 | 10/1985 | Marze . |
| 4,758,251 | 7/1988 | Swedo et al. ........................... 55/16 |
| 4,976,850 | 12/1990 | Kulitz . |
| 4,976,859 | 12/1990 | Wechs ............................. 210/500.41 |
| 5,013,765 | 5/1991 | Sluma et al. . |
| 5,147,553 | 9/1992 | Waite .................................. 210/654 |
| 5,246,582 | 9/1993 | Sluma et al. .................... 210/500.23 |

FOREIGN PATENT DOCUMENTS

| | | |
|---|---|---|
| 0 182 506 | 5/1986 | European Pat. Off. . |
| 0 228 072 | 7/1987 | European Pat. Off. . |
| 0 261 734 | 3/1988 | European Pat. Off. . |
| 0 294 737 | 12/1988 | European Pat. Off. . |
| 0 341 473 | 11/1989 | European Pat. Off. . |
| 0 361 085 | 4/1990 | European Pat. Off. . |
| 31 49 976 | 6/1983 | Germany . |
| 49912 | 3/1987 | Japan . |

OTHER PUBLICATIONS

Patent Abstracts of Japan, "Production of Microporous Membrane," vol. 11, No. 242 (C438), Aug. 7, 1987, JP 62–049912.

Abstract of Derwent Database WPI, "Ultrafiltration Membrane—Comprising Mixture of Polysulphone and Sulphonated Polysulphone for Pollution Resistance," JP 61–249504, Nov. 6,1986.

Patent Abstracts of Japan, "Polyester Sulfone Resin Semipermeable Membrane and Its Production," vol. 12, No. 338 (C–527) (3185), Sep. 12, 1988, JP 63–97202.

E. Neugebauer et al., "Histamine in Health and Disease," Behring Inst. Mitt., No. 68, pp. 102–133 (1981).

W. Lorenz et al., "Definition and Classification of the Histamine–Release Response to Drugs in Anaesthesia and Surgery: Studies in the Conscious Human Subject," *Klin Wochenschr,* 60, pp. 896–913 (1982).

G. Bonner et al., "Hemodynamic Effects of Bradykinin on Systemic and Pulmonary Circulation in Healthy and Hypertensive Humans," *J. Cardiovas. Pharmacol.,* vol. 15 (Suppl. 6), pp. S46–S56 (1990).

Primary Examiner—Ana Fortuna
Attorney, Agent, or Firm—Oliff & Berridge, PLC

[57] ABSTRACT

A synthetic membrane consisting of a mixture of polysulfone and sulfonated polysulfone and not more than 20 wt. % of other polymers, characterized in that the mixture contains 0.5 to 8 wt. % sulfonated polysulfone, possibly as the salt of sulfonic acid, and a method for manufacturing this synthetic membrane, characterized in that one or more solvents are added to a mixture composed of 0.5 to 8 wt. % sulfonated polysulfone, possibly as the salt of sulfonic acid, polysulfone and not more than 20 wt. % of other polymers, the mixture is dissolved to form a polymer solution, the latter is shaped, and precipitated to form a membrane in a precipitating bath by means of one or more precipitating agents.

37 Claims, No Drawings

POLYSULFONE MEMBRANE AND METHOD FOR ITS MANUFACTURE

FIELD OF THE INVENTION

The invention relates to a synthetic membrane consisting of a mixture of polysulfone and sulfonated polysulfone and no more than 20 wt. % of other polymers. The invention likewise relates to a method for manufacturing this synthetic membrane.

BACKGROUND

Synthetic membranes and separating processes based on them have been known for a long time. In addition to classical applications, for example, seawater desalination using reverse osmosis or ultrafiltration of process water from electrophoretic dip painting to recover the paint, membrane processes are becoming increasingly important in the areas of food technology, medicine, and pharmacy. In the latter cases, membrane separating processes have the great advantage that the materials to be separated are not subjected to thermal stress or even damaged.

Often, an important prerequisite for the usability of membranes in these areas is the sterilizability of the membrane. For safety and ecological reasons at least, steam sterilization is preferred over chemical sterilization, for example, using ethylene oxide, or sterilization by radiation, especially by gamma radiation.

Steam sterilization normally involves a half-hour treatment of the membrane or membrane system with hot steam at temperatures in excess of 110° C. Thus, the criterion of steam sterilizability severely limits the number of potential membrane materials. Thus, for example, membranes made of polyacrylonitrile are basically not steam-sterilizable because exceeding the glass temperature of the polymer results in an irreversible damage to the material and/or the membrane. In addition, hydrolysis-sensitive polymers, for example, certain polycarbonates and polyamides, cannot withstand hot steam sterilization unscathed.

Steam-sterilizable membranes made of polyether imides, polysulfones, or polyvinylidene fluoride are known, for example. A major disadvantage of these membranes consists in the hydrophobic nature of the membrane material, which prevents spontaneous wetting with aqueous media. Consequently, the membrane must be prevented from drying completely or the membrane must be treated with a hydrophobic agent, glycerin, for example, before drying.

Hydrophilic membranes are characterized by the fact that they are wettable with water. A measure of wettability is the wetting angle that a water drop forms with the surface of the membrane. In hydrophilic materials, this edge angle is always greater than 90°. Phenomenologically, the wetting of a dialysis membrane can also be detected by the fact that a drop of water placed on the surface of the membrane penetrates the membrane after a short time.

Another serious disadvantage of hydrophobic materials consists in the fact that they often possess a powerful nonspecific adsorption capacity. Therefore, when hydrophobic membranes are used, frequently a rapid, closely adhering coating of the membrane surface with preferably higher-molecular-weight solution components takes place. This phenomenon, known as fouling, leads to a rapid deterioration of the membrane permeability. Subsequent treatment of the membrane with a hydrophilizing medium cannot prevent fouling in the long term.

Suggestions for hydrophilic membranes have already been proposed that do not suffer from these disadvantages. Thus, DE-OS 3,149,976 proposes using a polymer mixture for making a hydrophilic membrane that contains at least 15 wt. % polyvinylpyrrolidone in addition to polysulfone or polyamide. For hydrophilization of polyimide and polyether sulfone membranes, for example, EP-A-0,228,072 claims the use of polyethylene glycol in amounts from 44 to 70 wt. %, based on the polymer solution.

Hydrophilization of membranes by using large quantities of water-soluble polymers however has the disadvantage that the hydrophilic nature of the membrane constantly decreases when they are used in aqueous media, since the water-soluble polymer is washed out. This can create a situation such that the membrane material recovers its original hydrophobic nature and the negative accompanying phenomena associated with it and listed above are exhibited.

EP-A-0,261,734 describes the hydrophilization of poly-etherimide membranes using polyvinylpyrrolidone. The polyvinylpyrrolidone is crossed linked in the non-swollen state to prevent the washing out effect. The membrane manufacturing process is very tedious and hence cost-intensive, since the solvent and precipitating agent must first be removed from the membrane after precipitation and prior to cross linking, but not the polyvinylpyrrolidone. It is only at this point that the cross linking of the polyvinylpyrrolidone is performed by using high temperature, radiation, or chemically using isocyanates, whose residues must be absolutely completely removed before the membrane is used in the food or medicine area.

The disadvantages described above can be avoided by using hydrophilic, yet water-insoluble, polymers for making the membranes. Thus, in a number of patents, for example, EP-A-0,182,506 and U.S. Pat. No. 3,855,122, the manufacture of membranes from sulfonated polymers is claimed. The methods described in these patents however are only suitable for making flat membranes. The membranes possess a high salt retention capacity and are used primarily for reverse osmosis.

Another approach to hydrophilic membranes is proposed in U.S. Pat. No. 4,207,182 and in two Japanese Disclosure documents (JP-OS 61-249,504 and JP-OS 62-49,912). According to these publications, hydrophilic membranes for ultrafiltration of aqueous solutions can be advantageously manufactured from mixtures of sulfonated and nonsulfonated polysulfone.

An important goal of the invention described in U.S. Pat. No. 4,207,182 is the use of highly concentrated polymer solutions to manufacture membranes which nevertheless are characterized by a high hydraulic permeability. This is accomplished by using polymer mixtures, with the percentage of sulfonated polysulfone based on the total polymer mixture of nonsulfonated and sulfonated polysulfone being between 10 and 30 wt. %.

A high hydraulic permeability however is not advantageous for all applications. Thus, high hydraulic permeability in dialysis results in reverse filtration and hence to contamination of the liquid to be dialyzed with undesired materials from the dialysate.

As indicated by the examples in U.S. Pat. No. 4,207,182, the membranes according to the invention are also characterized by high screening coefficients for dextran with a molecular weight of 110,000 daltons.

In view of the high hydraulic permeability and the associated high permeability for macromolecular substances with a molecular weight greater than 100,000 daltons, the membranes resulting from the claimed polymer mixtures are not suitable for hemodialysis. This is all the more so when one considers that the dialytic permeability of the membranes manufactured according to U.S. Pat. No. 4,207,182 is comparatively low.

U.S. Pat. No. 4,545,910 claims membranes that exhibit the performance data of a conventional ultrafiltration membrane. The material for the membrane can be chosen from a plurality of substances, including polyacrylonitrile compounds.

In manufacturing synthetic non-cellulosic membranes, such as those from materials such as polyethersulfone, polyamide, or polyacrylonitrile compounds, a number of properties of the material that play a role in the future application of the material must be taken into account.

Thus, such a membrane, if it is to be used for dialysis, must exhibit or produce histamine release which is as low as possible. Increased histamine release results in a series of unpleasant side effects in dialysis patients, such as headache and pain in the limbs as well as other pain states that have a negative effect on the health of the patient. The limiting value for histamine release of course must be determined individually for each person. This value depends on a plurality of factors (age, sex, weight, etc.) and therefore cannot be specified generally.

Histamine is a highly active biological substance so that in any event excessive release should be avoided. Reference is made in this connection, for example, to papers by E. Neugebauer et al., Behring Inst. Mitt., No. 68, 102–133 (1981) or W. Lorenz et al., Klin. Wochenschr. 60, 896–913 (1982).

A membrane of this kind should also exhibit values that are as low as possible for bradykinin generation. Bradykinin generation is likewise linked with unpleasant side effects that can pose a danger to dialysis patients (G. Bönner et al., J. of Cardiovasc. Pharm. 15 (Supplement 6), pp. 46–56 (1990). Even though the clinical significance of bradykinin generation like that of histamine release has not yet been completely studied, an attempt should be made to avoid whenever possible this generation which can be triggered by a high percentage of sulfonate compounds in the membrane through so-called "contact activation", during dialysis.

SUMMARY OF THE INVENTION

Hence, a goal of the invention is to provide a membrane which is steam-sterilizable, exhibits a high degree of biocompatibility, and is also outstandingly suited for use in the medical area because of its separating properties.

This and other goals are achieved by a synthetic membrane that is comprised of a mixture of polysulfone and sulfonated polysulfone and not more than 20 wt. % of other polymers, characterized by the fact that the mixture contains 0.5 to 8 wt. % of sulfonated polysulfone, possibly as the salt of sulfonic acid.

DESCRIPTION OF PREFERRED EMBODIMENTS

Preferably the mixture contains 2.7 to 7.3 wt. % sulfonated polysulfone and 97.3–92.7 wt. % polysulfone.

According to the invention, synthetic membranes are preferred in which the product of the degree of sulfonation of the sulfonated polysulfone and the percentage of sulfonated polysulfone in the mixture is $\leq 100$, especially preferably $\leq 50$.

Preferably the degree of sulfonation of the sulfonated polysulfone is between 0.5 and 15 mole-%, preferably however, between 2.5 and 9.0 mole-%.

Preferably the polysulfones involved are mainly polyethersulfones.

Preferably the sulfonated polysulfones are mainly polyethersulfones.

Preferably the polysulfones contain as a structural unit, a group with the formula:

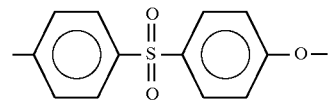

Preferably the sulfonated polysulfones contain as a structural element a group with the formula:

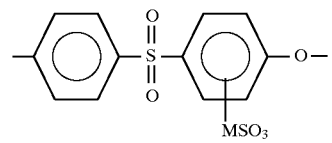

where M=H, Li, Na, K, $NH_4$, ½ Mg, ½ Ca.

The membrane according to the invention is sterilizable. Sterilization can be performed using hot steam or gamma radiation. However, sterilization can also be performed chemically if required.

According to the invention, the goal is also achieved of providing a method for manufacturing a synthetic membrane characterized by the fact that one or more solvents are added to a mixture comprised of 0.5 to 8 wt. % sulfonated polysulfone, possibly as the salt of the sulfonic acid, polysulfone, and not more than 20 wt. % of other polymers, the mixture is dissolved to form a polymer solution, the latter is shaped, and precipitated to form a membrane in a precipitating bath using one or more precipitating agents.

In the design of the invention, the polymer solution, in addition to the mixture of one or more polymers, such as polyvinylpyrrolidone, can contain polyalkylene glycols such as polyethylene glycol, polypropylene glycol, polyacrylic acids, or dextrans.

The precipitating agent is preferably a mixture of precipitating agents and contains one or more non-solvents as well as solvents for the mixture.

In addition, a gas or a mixture of gases that may contain solid particles and/or liquid particles, can be used as the precipitating agent.

According to a preferred embodiment of the invention, the gas is one that is reactive with respect to the polymer solution.

In another embodiment of the invention, the gas is inert with respect to the polymer solution.

Preferably dimethylformamide, dimethylsulfoxide, N-methylpyrrolidone, or dimethylacetamide are used as the solvent.

In the design of the invention, additives that are soluble in the polymer solution or the mixture of precipitating agents or are miscible therewith, including water itself, are contained in the polymer solution.

Preferably the same solvent is used for the precipitating agent and in the polymer solution.

Preferably the polymer solution is held at a temperature between 5° and 95° C.

Preferably the temperature of the precipitating bath is held between 0° and 100° C.

Especially preferably the precipitating bath is held at a temperature between 5° and 50° C.

According to one preferred embodiment of the invention, hollow fibers can be produced with the polymer solution being shaped into a hollow fiber in a hollow fiber jet, with the internal cavity of the hollow fiber being formed by a mixture of one or more solvents with one or more non-solvents.

In one preferred embodiment of the invention, the interior cavity is formed by a liquid.

According to another preferred embodiment of the invention, the inner cavity of the hollow fiber is formed by means of gases, aerosols, vapors, or mixtures thereof to produce the hollow fibers.

In an embodiment of the invention, the precipitating agent with which the internal cavity is formed and the precipitating agent with which the hollow fiber is precipitated externally, have different compositions.

In one preferred embodiment of the invention, the spinnerette is located above the precipitating bath and the distance between the spinnerette and the surface of the precipitating bath is at least 0.2 cm.

Another version according to the invention for manufacturing hollow fibers consists in the fact that the spinnerette is dipped in the precipitating bath and the fiber is spun from top to bottom.

In an embodiment of the invention, the hollow fiber that is formed, after leaving the hollow fiber jet, spins at least 0.2 second in the precipitating bath before it is deflected for the first time.

According to another preferred embodiment, the spinnerette is dipped in the precipitating bath and the fiber is spun from bottom to top.

It has proven advantageous for the invention for the hollow fiber nozzle to have a temperature between 5° and 95° C.

However, according to the method described above, it is also possible to make flat membranes or tubular membranes.

Preferably the membrane is washed and dried after leaving the precipitating bath.

The invention will now be described in greater detail using the following examples, in which PES stands for poly(ether)sulfone and SPES stands for sulfonated poly(ether)sulfone.

EXAMPLE 1

A spinning solution (polymer solution) composed of 22 wt. % of a mixture of 7% wt. % SPES and 93 wt. % PES (Vitrex 5200) and 78 wt. % dimethylsulfoxide (DMSO) was extruded through a commercial annular gap nozzle whereby at the same time a solution composed of 20 wt. % DMSO, 70 wt. % glycerin, and 10 wt. % $H_2O$ was added as an interior filling into the internal cavity of the hollow fiber as it formed. The nozzle was located at a distance of 0.5 cm above the surface of the precipitating bath. The temperature of the spinnerette was 60° C. The hollow fiber was precipitated in a precipitating bath with a composition of 90 wt. % DMSO and 10 wt. % $H_2O$ with the temperature of the precipitating bath being 50° C. The hollow fiber was pulled out of the precipitating bath at a rate of 60 m/min.

After washing the membrane with hot water at 60° C., aftertreatment was performed in a bath composed of 30 wt. % glycerin and 70 wt. % demineralized water. After winding and cutting, the material was dried at 113° C. for 45 minutes.

The resultant hollow fiber membrane had an inside diameter of 217 μm and a wall thickness of 24 μm.

The properties of the membrane were measured on bundles each composed of 100 hollow fibers, with the hollow fibers being exposed to flow internally in the permeability measurements.

An aqueous phosphate-buffered sodium chloride solution, containing 50 g albumin, 0.1 g cytochrome C, and 0.03 g sodium dithionite per liter of solution, was used to measure the ultrafiltration rate of albumin/cytochrome C solution.

The hollow fibers had the following properties:

| | |
|---|---|
| Ultrafiltration rate with water: | 316 ml/(m$^2$ · h · mmHg) |
| Ultrafiltration rate with albumin/cytochrome C solution: | 55 ml/(m$^2$ · h · mmHg) |
| Screening coefficient albumin: | 0.04 |
| Screening coefficient cytochrome C: | 0.87 |

In contrast to a comparable hollow fiber with a SPES content of more than 70 wt. %, the hollow fiber according to the invention exhibited bradykinin generation that was 82% less.

EXAMPLE 2

The method described in Example 1 was repeated, but the internal filling consisted of 20 wt. % DMSO, 65 wt. % glycerin, and 15 wt. % water.

The temperature of the precipitating bath was 25° C.; all the other parameters were the same as in Example 1.

The membrane hollow fibers thus obtained had an inside diameter of 209 μm and a wall thickness of 24 μm.

The following performance data were measured on the hollow fibers:

| | |
|---|---|
| Ultrafiltration rate with water: | 278 ml/(m$^2$ · h · mmHg) |
| Ultrafiltration rate with albumin/cytochrome C solution: | 43 ml/(m$^2$ · h · mmHg) |
| Screening coefficient albumin: | 0.02 |
| Screening coefficient cytochrome C: | 0.77 |
| Dialytic permeability for vitamin B12: | 7.2 × 10$^{-3}$ cm/min |
| Dialytic permeability for creatinine: | 21.9 × 10$^{-3}$ cm/min |

EXAMPLE 3

The method described in Example 2 was repeated, using a solution with the composition 40 wt. % DMSO, 40 wt. % glycerin, and 20 wt. % water to fill the interior.

The resultant membrane hollow fibers had a lumen measuring 209 μm and a wall thickness of 23 μm.

The following performance data were measured on them:

| | |
|---|---|
| Ultrafiltration rate with water: | 337 ml/(m$^2$ · h · mmHg) |
| Ultrafiltration rate with albumin/cytochrome C solution: | 35 ml/(m$^2$ · h · mmHg) |
| Screening coefficient albumin: | 0.00 |
| Screening coefficient cytochrome C: | 0.27 |
| Dialytic permeability for vitamin B12: | 11.7 × 10$^{-3}$ cm/min |
| Dialytic permeability for creatinine: | 34.4 × 10$^{-3}$ cm/min |

EXAMPLE 4

The method described in Example 2 was repeated but the interior filling consisted of 30 wt. % DMSO, 60 wt. % glycerin, and 10 wt. % water.

The hollow fiber thus obtained had an inside diameter of 204 μm and a wall thickness of 20 μm.

It had the following properties:

| | |
|---|---|
| Ultrafiltration rate with water: | 253 ml/(m² · h · mmHg) |
| Ultrafiltration rate with albumin/cytochrome C solution: | 43 ml/(m² · h · mmHg) |
| Screening coefficient albumin: | 0.03 |
| Screening coefficient cytochrome C: | 0.80 |
| Dialytic permeability for vitamin B12: | 12.5 × 10⁻³ cm/min |
| Dialytic permeability for creatinine: | 38.2 × 10⁻³ cm/min |

EXAMPLE 5

The same procedure was used as in Example 1, but the spinning solution consisted of 21 wt. % of a mixture of 7 wt. % SPES and 93 wt. % PES and 79 wt. % DMSO; the interior filling consisted of 40 wt. % DMSO, 50 wt. % glycerin, and 10 wt. % water.

The hollow fiber exhibited the following properties:

| | |
|---|---|
| Inside diameter: | 210 μm |
| Wall thickness: | 22 μm |
| Ultrafiltration rate with water: | 230 ml/(m² · h · mmHg) |
| Ultrafiltration rate with albumin/cytochrome C solution: | 40 ml/(m² · h · mmHg) |
| Screening coefficient albumin: | 0.02 |
| Screening coefficient cytochrome C: | 0.80 |
| Dialytic permeability for vitamin B12: | 9.0 × 10⁻³ cm/min |
| Dialytic permeability for creatinine: | 27.5 × 10⁻³ cm/min |

EXAMPLE 6

The same method was used as in Example 1 but the spinning solution consisted of 21 wt. % of the mixture of 7 wt. % SPES and 93 wt. % PES (Ultrason E 6020 P), 3 wt. % water, and 76 wt. % DMSO, while the interior filling was composed of 35 wt. % DMSO, 50 wt. % glycerin, and 15 wt. % water.

The temperature of the spinnerette was 70° C. The spinnerette was dipped in the precipitating bath and the fiber spun from top to bottom. The temperature of the precipitating bath was 15° C. Then an aftertreatment bath composed of 50 wt. % glycerin and 50 wt. % water was applied to the hollow fiber using suitable nozzles.

The hollow fiber had the following properties:

| | |
|---|---|
| Inside diameter: | 204 μm |
| Wall thickness: | 19 μm |
| Ultrafiltration rate with water: | 226 ml/(m² · h · mmHg) |
| Ultrafiltration rate with albumin/cytochrome C solution: | 48 ml/(m² · h · mmHg) |
| Screening coefficient albumin: | 0.001 |
| Screening coefficient cytochrome C: | 0.43 |
| Dialytic permeability for vitamin B12: | 13.8 × 10⁻³ cm/min |
| Dialytic permeability for creatinine: | 43.5 × 10⁻³ cm/min |

EXAMPLE 7

The procedure was the same as in Example 6 but the interior filling consisted of 33.6 wt. % DMSO, 48 wt. % glycerin, 14.4 wt. % water, and 4 wt. % polyvinylpyrrolidone.

The hollow fiber thus produced had the following properties:

| | |
|---|---|
| Inside diameter: | 210 μm |
| Wall thickness: | 22 μm |
| Ultrafiltration rate with water: | 206 ml/(m² · h · mmHg) |
| Ultrafiltration rate with albumin/cytochrome C solution: | 54 ml/(m² · h · mmHg) |
| Screening coefficient albumin: | 0.002 |
| Screening coefficient cytochrome C: | 0.34 |
| Dialytic permeability for vitamin B12: | 14.3 × 10⁻³ cm/min |
| Dialytic permeability for creatinine: | 46.6 × 10⁻³ cm/min |

EXAMPLE 8

The procedure was the same as in Example 6 but the spinning solution consisted of 23 wt. % of a mixture of 7 wt. % SPES and 93 wt. % PES, 3 wt. % water, and 74 wt. % DMSO, while the interior filling consisted of 88 wt. % glycerin and 12 wt. % water.

The hollow fiber thus produced had the following properties:

| | |
|---|---|
| Inside diameter: | 192 μm |
| Wall thickness: | 35 μm |
| Ultrafiltration rate with water: | 150 ml/(m² · h · mmHg) |
| Ultrafiltration rate with albumin/cytochrome C solution: | 43 ml/(m² · h · mmHg) |
| Screening coefficient albumin: | 0.004 |
| Screening coefficient cytochrome C: | 0.19 |
| Dialytic permeability for vitamin B12: | 8.2 × 10⁻³ cm/min |
| Dialytic permeability for creatinine: | 26.0 × 10⁻³ cm/min |

EXAMPLE 9

The procedure was the same as in Example 8 but the hollow fiber was stretched in a water bath at 60° C. by 20% and then relaxed 2.8%.

The hollow fiber exhibited the following properties:

| | |
|---|---|
| Inside diameter: | 192 μm |
| Wall thickness: | 34 μm |
| Ultrafiltration rate with water: | 370 ml/(m² · h · mmHg) |
| Ultrafiltration rate with albumin/cytochrome C solution: | 68 ml/(m² · h · mmHg) |
| Screening coefficient albumin: | 0.052 |
| Screening coefficient cytochrome C: | 0.72 |
| Dialytic permeability for vitamin B12: | 11.3 × 10⁻³ cm/min |
| Dialytic permeability for creatinine: | 34.5 × 10⁻³ cm/min |

All the hollow fibers according to the invention exhibit a significantly reduced histamine release and bradykinin generation in contrast to corresponding hollow fibers like those that can be produced according to the known prior art, for example, with a content of more than 70% SPES.

While the invention has been described in detail and with reference to specific examples thereof, it will be apparent to one skilled in the art that various changes and modifications can be made therein without departing from the spirit and scope thereof.

What is claimed is:

1. A synthetic hemodialysis membrane comprising polyethersulfone and 0.5 to 8 wt. % sulfonated polyethersulfone, wherein said sulfonated polyethersulfone has a degree of sulfonation of between 0.5 and 9.0 mole-%, and wherein the polyethersulfone comprises a group with the formula:

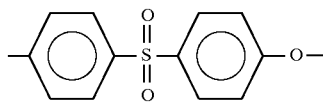

2. The synthetic hemodialysis membrane according to claim 1, wherein said sulfonated polyethersulfone is a salt of a sulfonic acid.

3. The synthetic hemodialysis membrane according to claim 1, comprising 2.7 to 7.3 wt. % of said sulfonated polyethersulfone and 97.3 to 92.7 wt. % of said polyethersulfone.

4. The synthetic hemodialysis membrane according to claim 1, wherein said sulfonated polyethersulfone has a degree of sulfonation which when multiplied by the wt. % of sulfonated polyethersulfone yields a product $\leq 50$.

5. The synthetic hemodialysis membrane according to claim 1, wherein said sulfonated polysulfone has a degree of sulfonation which is between 2.5 and 9.0 mole-%.

6. The synthetic hemodialysis membrane according to claim 1, further comprising at least one other polymer selected from the group consisting of polyethylene glycol, polypropylene glycol, polyacrylic acids, dextran and polyvinylpyrrolidone.

7. The synthetic hemodialysis membrane according to claim 1, wherein the sulfonated polysulfone comprises a group with the formula:

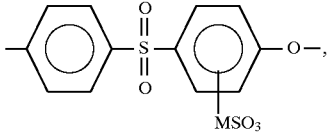

where M is H, Li, Na, K, $NH_4$, ½ Mg or ½ Ca.

8. The synthetic hemodialysis membrane according to claim 1, wherein said membrane is sterilizable.

9. The synthetic hemodialysis membrane according to claim 8, wherein said membrane is sterilizable by hot steam or gamma radiation.

10. A method for manufacturing a synthetic hemodialysis membrane, said method comprising:

mixing 0.5 to 8 wt. % sulfonated polyethersulfone and polyethersulfone to form a mixture, said polyethersulfone comprising a group with the formula:

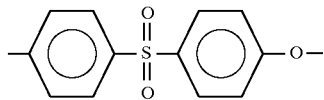

and said sulfonated polyethersulfone has a degree of sulfonation of between 0.5 and 9.0 mole-%;

dissolving said mixture in at least one solvent to form a polymer solution;

shaping said polymer solution; and precipitating said polymer solution in a precipitating bath comprising at least one precipitating agent to form said synthetic hemodialysis membrane.

11. The method according to claim 10, wherein said sulfonated polyethersulfone is a salt of a sulfonic acid.

12. The method according to claim 10, wherein the polymer solution further comprises a polyalkylene glycol.

13. The method according to claim 10, wherein said polymer solution further comprises at least one polymer selected from the group consisting of polyethylene glycol, polypropylene glycol, polyacrylic acids, dextran and polyvinylpyrrolidone.

14. The method according to claim 10, wherein the precipitating bath comprises a plurality of precipitating agents and at least one non-solvent for the mixture.

15. The method according to claim 14, wherein the precipitating bath further comprises at least one precipitating agent solvent for the mixture.

16. The method according to claim 15, wherein the solvent is the same as the precipitating agent solvent.

17. The method according to claim 10, wherein said at least one precipitating agent comprises at least one gas.

18. The method according to claim 17, wherein said at least one precipitating agent further comprises at least one member selected from the group consisting of solid particles and liquid particles.

19. The method according to claim 17, wherein said at least one gas is reactive with respect to the polymer solution.

20. The method according to claim 17, wherein said at least one gas is inert with respect to the polymer solution.

21. The method according to claim 10, wherein said at least one solvent is selected from the group consisting of dimethylformamide, dimethylsulfoxide, N-methylpyrrolidone and dimethylacetamide.

22. The method according to claim 10, wherein at least one of said polymer solution and said precipitating agent comprises at least one additive that is soluble in or miscible with the polymer solution or the precipitating agent, respectively.

23. The method according to claim 22, wherein said at least one additive is water.

24. The method according to claim 10, wherein the polymer solution is maintained at a temperature between 5° and 95° C.

25. The method according to claim 10, wherein the precipitating agent is maintained at a temperature between 0° and 100° C.

26. The method according to claim 10, wherein the precipitating agent is maintained at a temperature between 5° and 50° C.

27. The method according to claim 10, wherein the polymer solution is shaped in a hollow fiber nozzle to form a hollow fiber with a continuous interior cavity, the interior cavity of the hollow fiber being formed by at least one shaping solvent and at least one non-solvent.

28. The method according to claim 27, wherein the interior cavity is formed by a liquid.

29. The method according to claim 27, wherein the interior cavity is formed by at least one member selected from the group consisting of gases, aerosols and vapors.

30. The method according to claim 27, wherein the interior cavity is formed by a cavity-forming precipitating agent having a different composition from a fiber-forming precipitating agent that forms the hollow fiber.

31. The method according to claim 27, wherein the hollow fiber nozzle is located above the precipitating bath and a distance between the hollow fiber nozzle and the precipitating bath surface is at least 0.2 cm.

32. The method according to claim 27, wherein the hollow fiber nozzle dips into the precipitating bath and the fiber is spun from top to bottom.

33. The method according to claim 27, wherein the hollow fiber formed, after leaving the hollow fiber nozzle, spends at least 0.2 seconds in the precipitating bath before it is deflected for the first time.

34. The method according to claim 27, wherein the hollow fiber nozzle dips into the precipitating bath and the hollow fiber is spun from bottom to top.

35. The method according to claim 27, wherein the hollow fiber nozzle has a temperature between 5° and 95° C.

36. The method according to claim 10, wherein said synthetic hemodialysis membrane is flat or tubular.

37. The method according to claim 10, further comprising removing said synthetic hemodialysis membrane from the precipitating bath, and subsequently washing and drying the synthetic hemodialysis membrane.

* * * * *